(12) United States Patent
Jeon (10) Patent No.: US 11,038,233 B2
(45) Date of Patent: Jun. 15, 2021

(54) BATTERY COOLING DEVICE FOR VEHICLE

(71) Applicants: Hyundai Motor Company, Seoul (KR); Kia Motors Corporation, Seoul (KR)

(72) Inventor: Yoon Cheol Jeon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 169 days.

(21) Appl. No.: 16/172,666

(22) Filed: Oct. 26, 2018

(65) Prior Publication Data

US 2019/0379014 A1 Dec. 12, 2019

(30) Foreign Application Priority Data

Jun. 7, 2018 (KR) .......................... 10-2018-0065219

(51) Int. Cl.
| | |
|---|---|
| *H01M 50/20* | (2021.01) |
| *H01M 10/613* | (2014.01) |
| *H01M 10/625* | (2014.01) |
| *H01M 10/647* | (2014.01) |
| *H01M 10/6556* | (2014.01) |
| *H01M 10/6567* | (2014.01) |

(52) U.S. Cl.
CPC ......... *H01M 50/20* (2021.01); *H01M 10/613* (2015.04); *H01M 10/625* (2015.04); *H01M 10/647* (2015.04); *H01M 10/6556* (2015.04); *H01M 10/6567* (2015.04); *H01M 2220/20* (2013.01)

(58) Field of Classification Search
CPC ................ F28D 15/02; F28D 15/0233; F28D 2012/0028; F28D 2021/0043; F28D 2021/008; F28D 9/0062; F28F 3/02; H01M 10/613; H01M 10/617; H01M 10/625; H01M 10/647; H01M 10/653; H01M 10/6554; H01M 10/6556; H01M 10/6567; H01M 10/6569; H01M 2220/20; H01M 2/1077
See application file for complete search history.

(56) References Cited

U.S. PATENT DOCUMENTS

| | | | | |
|---|---|---|---|---|
| 2010/0307723 | A1* | 12/2010 | Thomas | H01M 10/6551 165/104.33 |
| 2011/0262794 | A1* | 10/2011 | Yoon | H01M 10/6554 429/120 |
| 2014/0138075 | A1* | 5/2014 | Yang | H01L 23/473 165/185 |
| 2015/0194714 | A1* | 7/2015 | You | H01M 10/613 429/120 |

FOREIGN PATENT DOCUMENTS

KR 2010-0054684 A 5/2010

* cited by examiner

*Primary Examiner* — Adam A Arciero
(74) *Attorney, Agent, or Firm* — Mintz Levin Cohn Ferris Glovsky and Popeo, P.C.; Peter F. Corless (57) ABSTRACT

A battery cooling device for a vehicle is provided. The battery cooling device generates a continuous phase change of the refrigerant within an entire area of a refrigerant channel having a refrigerant flowing for cooling a battery module to maximize a cooling performance of all battery cells of the battery module, and enable even cooling of the battery cells.

9 Claims, 4 Drawing Sheets

BATTERY COOLING DEVICE FOR VEHICLE

CROSS REFERENCE TO RELATED APPLICATION

The present application claims priority to Korean Patent Application No. 10-2018-0065219, filed Jun. 7, 2018, the entire contents of which is incorporated herein for all purposes by this reference.

BACKGROUND

Field of the Invention

The present invention relates generally to a battery cooling device for a vehicle, and more particularly, to a battery cooling device for a vehicle, wherein the phase change of a refrigerant is used to maintain temperatures of battery cells of a battery module within a predetermined range.

Description of the Related Art

Recently, an electric vehicle requires long-distance driving, high-power/high-performance driving, and quick charging, and a battery system as an energy source of the electric vehicle has high levels of electric current flowing in battery cells thereof, which causes heat greater than the capacity of conventional battery cooling device applied to existing electric vehicles. Since the heat produced in the battery cells has an adverse effect on battery life, the heat is required to be maintained at a predetermined temperature range.

For temperature maintenance of the battery cells, existing electric vehicles use an air cooling system or a water cooling system. In particular, the air cooling system provides air within a vehicle cabin to the battery system by using a cooling fan to cool the battery cells. The water cooling system provides a coolant cooled by an additional battery chiller in a front of the vehicle, the battery chiller operating in cooperation with a radiator or an air conditioner compressor, to the battery system by using a pump to cool the battery cells. However, an electric vehicle uses high levels of electric current for long-distance driving and high-power/high-performance driving, and accordingly even though the electric vehicle uses a water cooling system having cooling performance greater than cooling performance of an air cooling system, increasing the capacities of the air conditioner compressor (or the radiator) and the battery chiller to cool heat produced in the battery cells is unavoidable.

The foregoing is intended merely to aid in the understanding of the background of the present invention, and is not intended to mean that the present invention falls within the purview of the related art that is already known to those skilled in the art.

SUMMARY

Accordingly, the present invention provides a battery cooling device for a vehicle, wherein the battery cooling device generates a continuous phase change of the refrigerant within an entire area of a refrigerant channel having a refrigerant flowing for cooling a battery module, thereby maximizing a cooling performance of all battery cells of the battery module, and enabling cooling of the battery cells.

According to the present invention, in the battery cooling device for a vehicle of the present invention, the refrigerant evaporated by heat produced in the battery cells may be restored to a liquid refrigerant using a coolant, thereby maintaining an even cooling performance for the battery cells, from the battery cells disposed at an upper flow side in a flow direction of the refrigerant to the battery cells disposed at a lower flow side thereof, relative to the flow direction of the refrigerant. In addition, the present invention also provides a battery cooling device for a vehicle, wherein a pair of plate members having corrugated parts are used to configure a refrigerant plate having the refrigerant channel, thereby increasing heat exchange efficiency of the refrigerant flowing in the refrigerant channel, and improving manufacturing efficiency and rigidity of the refrigerant plate.

According to one aspect of the present invention, a battery cooling device for a vehicle to cool a battery module composed of a plurality of battery cells may include: a refrigerant plate that extends in arranged directions of the plurality of battery cells and has a refrigerant flowing for cooling the plurality of battery cells; and a coolant plate arranged to enable heat exchange with the refrigerant plate, and having a coolant flowing for liquefying a refrigerant evaporated by heat produced in the battery cells. The refrigerant plate may include: a first plate member arranged to enable heat exchange with the plurality of battery cells; a second plate member arranged to enable heat exchange with the coolant plate; and a refrigerant channel disposed between the first plate member and the second plate member, and having the refrigerant flowing in the refrigerant channel.

Specifically, the first plate member may be disposed to be in contact with the plurality of battery cells to enable heat exchange therewith, and the second plate member may be disposed to be in contact with the coolant plate to enable heat exchange therewith. In addition, the first plate member may include a first corrugated part having ridges and grooves on a surface of the first plate member which is not in contact with the plurality of battery cells, and the second plate member may include a second corrugated part having ridges and grooves on a surface of the second plate member which is not in contact with the coolant plate, and the first corrugated part and the second corrugated part may be spaced apart from each other at an interval corresponding to a width of the refrigerant channel.

Particularly, the first plate member and the second plate member may be configured to be flat plates. The first corrugated part may include at least one fin that extends therefrom toward the refrigerant heating channel, and the second corrugated part may include at least one fin that extends therefrom toward the refrigerant cooling channel. In addition, the fin provided on the first corrugated part and the fin provided on the second corrugated part may be joined on surfaces of the first corrugated part and the second corrugated part respectively by any one joining method selected among furnace brazing, resistance welding, ultrasonic welding, and laser welding.

The refrigerant channel may include a plurality of refrigerant heating channels in which the refrigerant is heated by heat exchange with the battery cells, and a plurality of refrigerant cooling channels in which the refrigerant is cooled by heat exchange with the coolant plate, each of the refrigerant heating channels and each of the refrigerant cooling channels being alternately arranged in the arranged directions of the battery cells. The refrigerant heating channel may be disposed between the battery cells and the coolant plate to neighbor (e.g., by proximate to) the battery cells, and the refrigerant cooling channel may be disposed between the battery cells and the coolant plate to neighbor the coolant plate. Additionally, the refrigerant channel may include a refrigerant transfer channel arranged between the refrigerant heating channel and the refrigerant cooling channel.

In addition, cell covers supporting the plurality of battery cells and the refrigerant plate may be in contact with each other via a first interface member made of a thermal interface material which enhance the cooling performance by filling the gap or air-filled pore space between the cell covers and the refrigerant plate. The coolant plate and the refrigerant plate may be in contact with each other via a second interface member made of a thermal interface material which enhance the cooling performance by filling the gap or air-filled pore space between the coolant plate and the refrigerant plate.

According to the present invention, the battery cooling device has the following advantages.

First, when a liquid refrigerant for cooling the battery module is evaporated by heat produced in the battery module, the evaporated refrigerant may be restored to the liquid refrigerant. Accordingly, the liquid refrigerant in an entire area of the refrigerant channel may be used to cool the battery cells, and a cooling effect on the battery cells arranged in a flow direction of the refrigerant may be evenly maintained regardless of positions of the battery cells. In other words, cooling performance of the refrigerant for the battery cells may be evenly maintained from the battery cells arranged at an upper flow side of the flow direction to the battery cells arranged at a lower flow side thereof relative to the flow direction of the refrigerant, and thus the cooling effect on the battery cells may be prevented from decreasing in the flow direction of the refrigerant. Accordingly, it may be possible to maximize the cooling effect on all of the battery cells cooled by the refrigerant, and to cool the battery cells evenly.

Second, latent heat of vaporization produced during a phase change of the refrigerant from liquid to gas may be used to cool the battery cells, and thus cooling performance may be improved, compared to when a sensible heat of the refrigerant is used to cool the battery cells. In particular, cooling the battery cells by using the latent heat can have several times higher cooling effect than cooling the battery cells by using the sensible heat.

Third, unlike an existing water cooling system, it may be possible to increase a cooling effect of a battery without increasing the capacities of an air conditioner compressor (or a radiator) and a battery chiller used to cool the coolant.

Fourth, a relatively minimal amount of the refrigerant may be used to maintain temperature of each of the battery cells within a predetermined range.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Hereinbelow, the present invention will be described in detail such that one of ordinary skill in the related art can embody it efficiently.

When a liquid refrigerant is used to cool a battery module as an energy source of an electric vehicle, the refrigerant absorbs heat produced in the battery module while flowing in a refrigerant channel, and cools the battery module. While being evaporated by heat produced in the battery module, the liquid refrigerant cools the battery module, and after evaporation of the liquid refrigerant, an evaporated refrigerant absorbs the heat of the battery module and cools the battery module. There is a considerable difference between a first energy value in the unit of calorie required to cool the battery module by using latent heat of vaporization produced during evaporation of the liquid refrigerant, and a second energy value in the unit of calorie required to cool the battery module by using a single-phase sensible heat when the refrigerant is in the evaporated state.

Though the difference between the first energy value and the second energy value may be different depending on the type of the refrigerant, the first energy value is around six times higher than the second energy value. The difference is caused due to cooling the battery module by using a phase change of the refrigerant without temperature change thereof is substantially greater in cooling performance than cooling the battery module by using the temperature change alone without the phase change of the refrigerant. Accordingly, a difference between an energy value in the unit of calorie absorbed from the battery module before the refrigerant is evaporated and an energy value in the unit of calorie absorbed therefrom after the refrigerant is evaporated occurs, and after the evaporation of the refrigerant, the cooling of the battery module is rarely performed. In other words, the refrigerant in an evaporated state has even less cooling performance than the refrigerant in a liquid state. Further, since even after the refrigerant turns to the evaporated refrigerant, the evaporated refrigerant is heated by heat produced in the battery cells, it is difficult for the evaporated refrigerant to restore to an original phase.

Furthermore, in the battery cells of the battery module, a considerable difference occurs in cooled amounts between the battery cells cooled before the evaporation of the refrigerant and the battery cells cooled after the evaporation of the refrigerant, and when the battery cells are cooled after the evaporation of the refrigerant, a required cooling is rarely performed, and thus it may be difficult to perform an even cooling of the battery cells which constitute the battery module.

Figure 1:
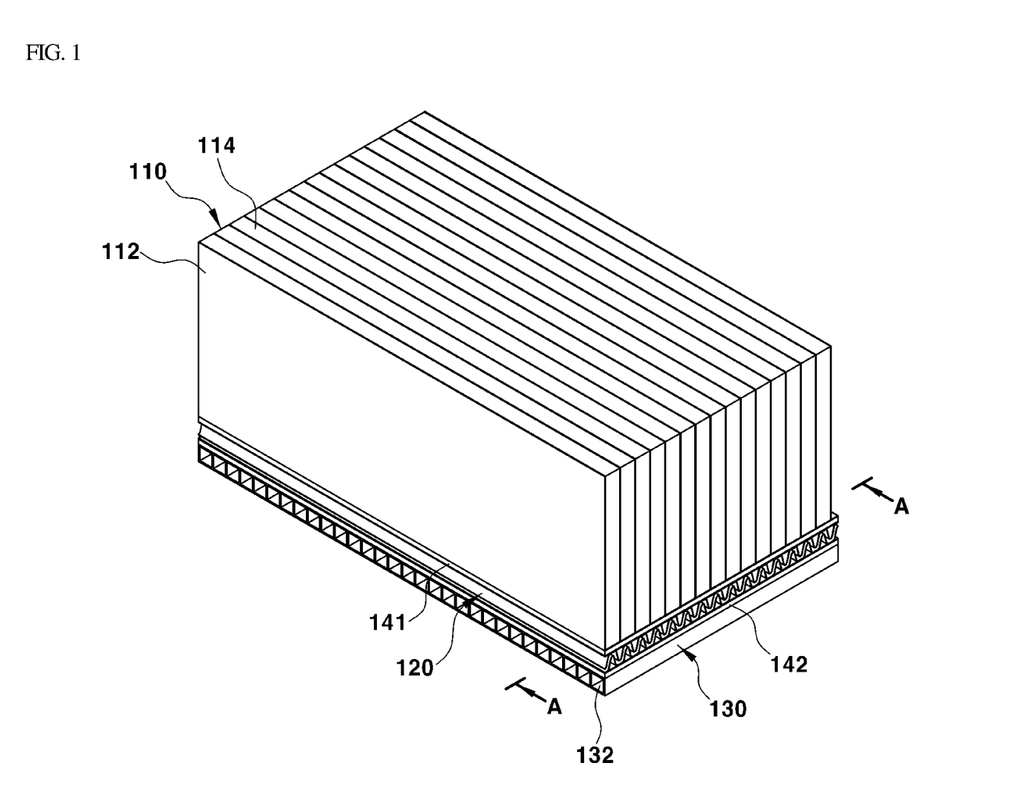
FIGS. 1 and 2 are perspective views showing a battery cooling device for a vehicle according to an exemplary embodiment of the present invention.
Figure 2:
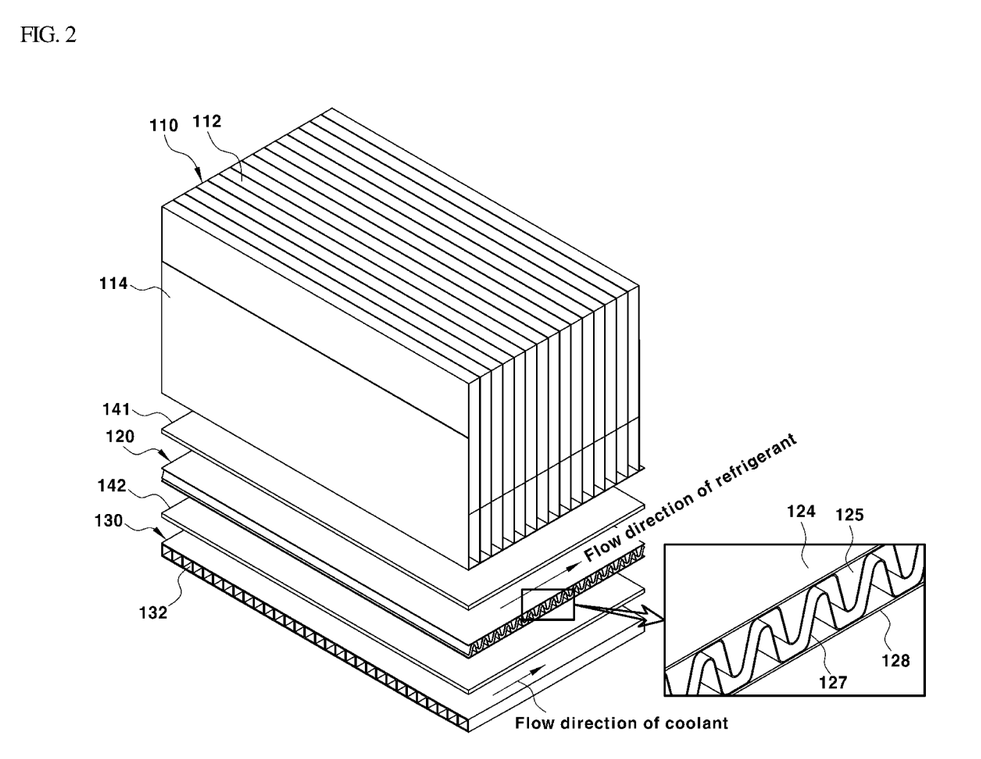

Therefore, according to the present invention, a battery cooling device for a vehicle is configured to have a battery cooling structure capable of restoring the evaporated refrigerant to the liquid refrigerant to maximize a cooling effect on the battery cells of the battery module, and to enable the even cooling of the battery cells. In other words, according to the present invention, the battery cooling device may generate a continuous phase change of the refrigerant, thereby improving the cooling effect on all the battery cells arranged in a flow direction of the refrigerant. FIGS. 1 and 2 are views showing the battery cooling device for a vehicle according to an exemplary embodiment of the present invention, and FIG. 3 is a cross-sectional view taken along line A-A of FIG. 1, and FIG. 4 is a cross-sectional view showing a phase change of the refrigerant occurring in the refrigerant channel.

According to the present invention, the battery cooling device may be configured to cool the battery module 110 having a plurality of battery cells 112, and a refrigerant plate 120 may be used to restore the refrigerant evaporated by heat produced in the battery cells disposed at an upper flow side of the flow direction of the refrigerant, relative to the flow direction, to the liquid refrigerant, and the refrigerant plate 120 may be configured to perform the continuous phase change of the refrigerant in a flow direction of the refrigerant.

Figure 3:
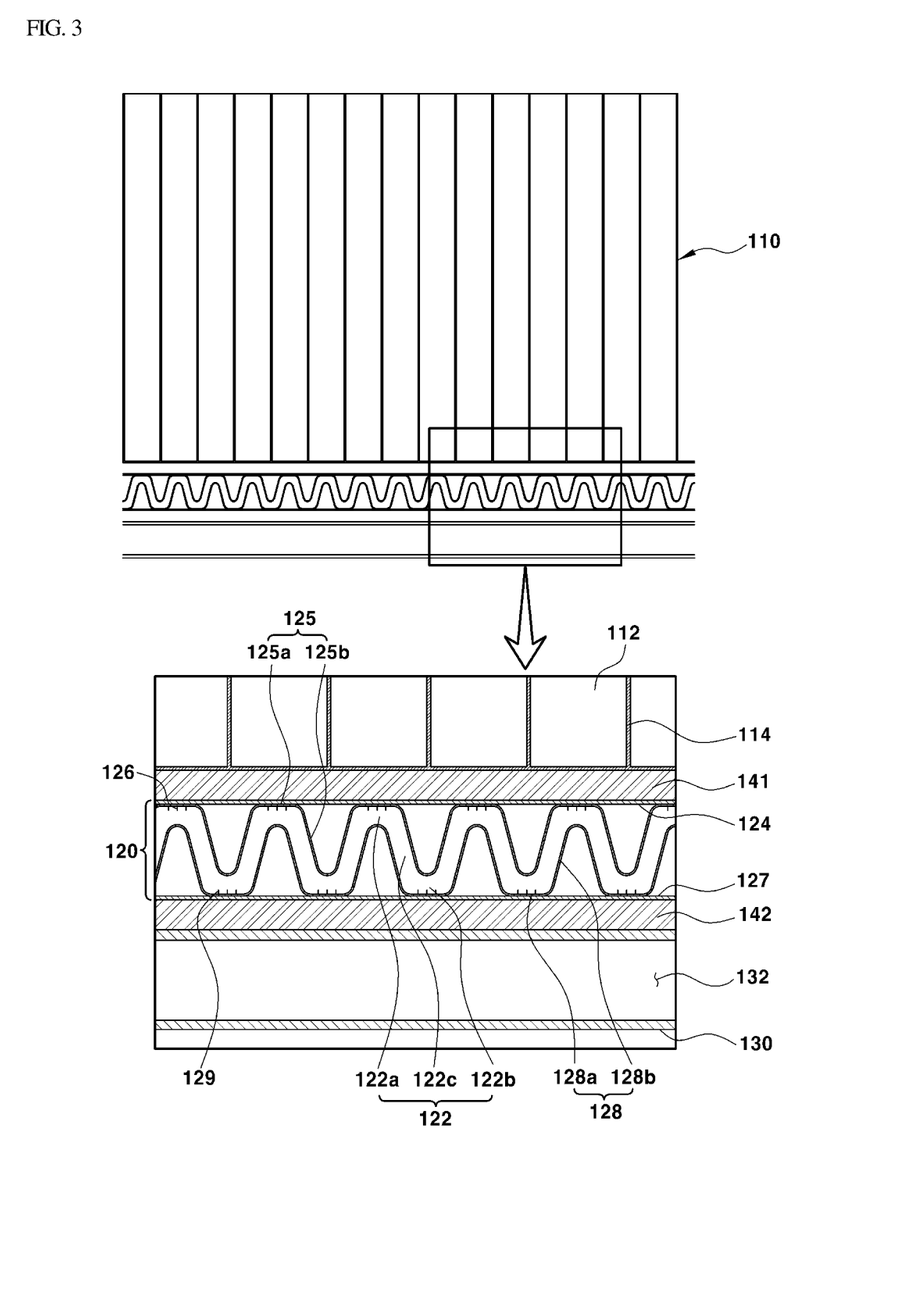
FIG. 3 is a cross-sectional view taken along line A-A of FIG. 1 according to an exemplary embodiment of the present invention.
Figure 4:
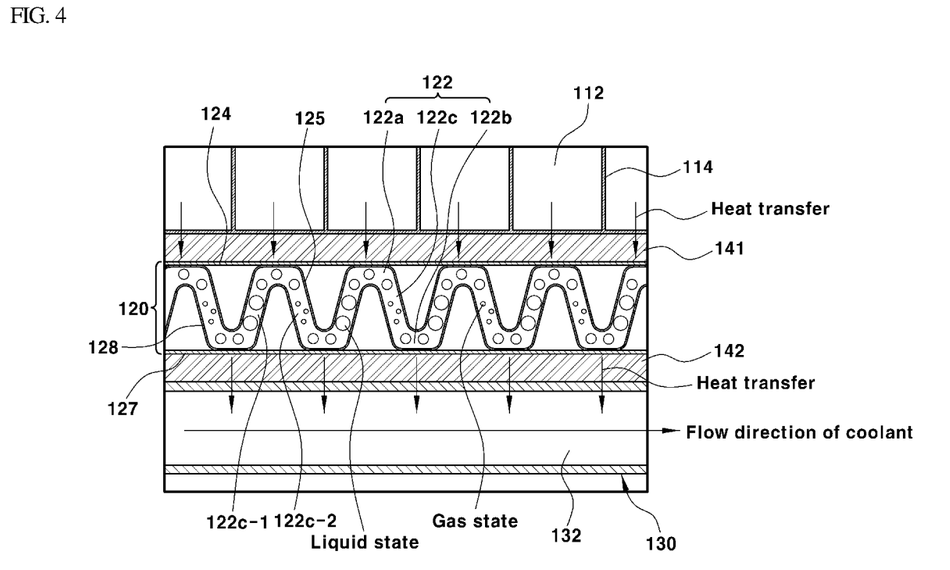
FIG. 4 is a cross-sectional view showing a phase change of a refrigerant occurring in a refrigerant channel according to an exemplary embodiment of the present invention.

As shown in FIGS. 1 to 3, the battery cooling device may include the refrigerant plate 120 in which the refrigerant flows for cooling the battery module 110, and a coolant plate 130 in which a coolant flows for cooling the refrigerant. The battery module 110 may include the plurality of battery cells 112 electrically connected in series, and cell covers 114 that support the plurality of battery cells 112. Each of the battery cells 112 as a least unit for generating electricity may be structurally divided by the cell covers 114 from each other. Furthermore, the plurality of battery cells 112 may be held in compartments provided in the cell covers 114 respectively, and may be arranged and supported in a line while held within the compartment. As shown in the drawings, the battery module 110 may be held in a battery case that surrounds the battery module 110, and may be submerged in an electrolyte in the battery case.

The refrigerant plate 120 may be disposed on one side of the battery module 110 to enable heat exchange with the plurality of battery cells 112. Particularly, when the battery module 110 is loaded in a vehicle, the battery module 110 may be arranged in such a manner that the refrigerant plate is in contact with a lower end of the battery module 110. In particular, the refrigerant plate 120 may be disposed between the battery module 110 and the battery case, and may be disposed at lower ends of the plurality of battery cells 112, with the cell covers 114 between the refrigerant plate and the battery module (see FIG. 3). Heat produced in the battery cells 112 may be transferred via the cell covers 114 to the refrigerant plate 120. The cell covers 114 may be made of a material which allows the heat produced in the battery cells 112 to be efficiently transferred to the refrigerant plate 120.

The refrigerant plate 120 may be disposed to extend in the arranged directions of the plurality of battery cells 112, and may include the refrigerant channel 122 which enables the refrigerant to flow in the arranged directions of the battery cells 112. As shown in FIGS. 1 to 3, the refrigerant plate 120 may include a first plate member 124 and a second plate member 127, and the refrigerant channel 122 disposed between the first plate member 124 and the second plate member 127.

The refrigerant flowing in the refrigerant channel 122 may be heated by heat produced in the plurality of battery cells 112, and may be cooled by the coolant flowing in the coolant plate 130. Accordingly, the refrigerant plate 120 may be arranged to neighbor (e.g., be proximate to) the plurality of battery cells 112 to enable heat transfer with the plurality of battery cells 112, and may be disposed to extend in the arranged directions of the battery cells 112. In addition, the refrigerant plate 120 may be disposed to neighbor (e.g., be proximate to) the coolant plate 130 to enable heat transfer with the coolant plate 130 for cooling the refrigerant. The refrigerant plate 120 may be disposed to neighbor (e.g., be proximate to) the battery cells 112 and the coolant plate 130, thereby performing heat exchange with the battery cells 112 and the coolant plate 130 due to contact therewith.

More specifically, the refrigerant plate 120 may be disposed between the plurality of battery cells 112 and the coolant plate 130 to perform heat exchange therewith, and the refrigerant of the refrigerant plate may be heated by heat released from the battery cells 112, and cooled by heat released from the coolant plate 130. When the refrigerant flowing in the refrigerant channel 122 of the refrigerant plate 120 is heated by heat produced in the battery cells 112, the refrigerant may be evaporated, and when the refrigerant is cooled by heat (a chill) produced in the coolant plate 130, the refrigerant may be liquefied.

Accordingly, while the refrigerant channel 122 is in contact with the plurality of battery cells 112 disposed at an upper side thereof and the coolant plate 130 disposed at a lower side thereof at the same time, the refrigerant channel 122 may include a corrugated structure repeating alternate ridges and grooves at an upper and a lower side thereof for generating repeated evaporation and liquefaction of the refrigerant. Specifically, the refrigerant channel 122 may include a plurality of refrigerant heating channels 122*a* in which the refrigerant may be heated and evaporated by heat exchange with the battery cells 112, and a plurality of refrigerant cooling channels 122*b* in which the refrigerant may be cooled and liquefied by heat exchange with the coolant plate 130.

The refrigerant heating channels 122*a* may be in contact with (e.g., abut) the battery cells 112 between the battery cells 112 and the coolant plate 130, and the refrigerant passing through the refrigerant heating channels 122*a* may be heated and evaporated by heat transferred from the battery cells 112 (see FIG. 4). Evaporation heat (e.g., the latent heat of vaporization) produced during the evaporation of the refrigerant may be used to cool the battery cells 112. The refrigerant cooling channels 122*b* may be in contact with the coolant plate 130 between the battery cells 112 and the coolant plate 130, and the refrigerant passing through the refrigerant cooling channels 122*b* may be cooled and liquefied by heat transferred from the coolant plate 130 (see FIG. 4).

While neighboring the battery cells 112, the plurality of refrigerant heating channels 122*a* are disposed in the arranged directions of the battery cells 112 and are spaced apart from the battery cells, and while neighboring the coolant plate 130, the refrigerant cooling channels 122*b* are disposed in the arranged directions of the battery cells 112 and are spaced apart from the coolant plate, each of the refrigerant heating channels 122*a* and each of the refrigerant cooling channels 122*b* may be alternately arranged in the arranged directions of the battery cells 112. Each of refrigerant transfer channels 122*c* may integrally extend from the refrigerant heating channel 122*a* to the refrigerant cooling channel 122*b* therebetween, and the refrigerant transfer channels 122*c* may be slantingly arranged at a predetermined angle (e.g., disposed at an incline) to achieve the flow efficiency of the refrigerant.

FIG. 4 shows a state of the refrigerant being evaporated while the refrigerant receiving heat of the battery cells 112 transferred from the refrigerant heating channel 122*a* flows to a refrigerant transfer channel 122*c*-2, and a state of the refrigerant being liquefied while the refrigerant receiving heat of the coolant transferred from the refrigerant cooling channel 122*b* flows to a refrigerant transfer channel 122*c*-1. As show in FIG. 4, when the liquid refrigerant flows to the refrigerant heating channel 122*a*, the liquid refrigerant may be evaporated by heat transferred from the battery cells 112. Since the refrigerant heated in the refrigerant heating channel 122*a* constantly flows to the refrigerant transfer channel 122*c*, the refrigerant may be evaporated and generate evaporation heat even while the refrigerant is flowing from the refrigerant heating channel 122*a* to the refrigerant transfer channel 122*c*.

Accordingly, when the evaporated refrigerant flows to the refrigerant cooling channel 122*b*, the evaporated refrigerant may be liquefied by heat transferred from the coolant plate 130. The refrigerant cooled in the refrigerant cooling channel 122*b* may constantly flow into the refrigerant transfer channel 122*c* disposed at a lower flow side of the refrigerant cooling channel 122*b* relative to the flow direction of the refrigerant. Accordingly, even when the refrigerant flows from the refrigerant cooling channel 122*b* to the refrigerant transfer channel 122*c*, the refrigerant may be condensed and restored to the liquid refrigerant. When the refrigerant passes through the refrigerant channel 122, the refrigerant may be evaporated by heat transferred from the battery cells 112, and then may be liquefied by heat transferred from the coolant plate 130, and such a phase change of the refrigerant may be repeated while the refrigerant flows in the refrigerant channel 122.

While remaining in the liquid state, the refrigerant may cool all of the battery cells 112 neighboring the refrigerant channel 122, and the evaporation heat (the latent heat of vaporization) produced when the refrigerant is evaporated by heat produced in the battery cells 112 is used to cool the battery cells 112 efficiently. As a result, the refrigerant plate 120 may cool all of the battery cells 112 of the battery module 110 by using the latent heat of vaporization, not by using the single-phase sensible heat, thereby increasing the cooling effect on each of the battery cells 112, and enabling the even cooling of all of the battery cells 112.

Furthermore, FIG. 4 shows one example of a state change of the refrigerant. While maintaining a state changed in the refrigerant heating channel 122*a* (or the refrigerant cooling channel) at the upper flow side of the flow direction of the refrigerant, the refrigerant passing through the refrigerant transfer channel 122*c* may flow to the refrigerant cooling channel 122*b* (or the refrigerant heating channel) at the lower flow side of the flow direction of the refrigerant, whereby the phase of the refrigerant may turn into liquid or gas.

Meanwhile, the first plate member 124 and the second plate member 127 of the refrigerant plate 120 may be disposed to oppose each other, with the refrigerant channel 122 disposed therebetween. The first plate member 124 and the second plate member 127 may be combined with and be fixed to each other while the first plate member 124 and the second plate member 127 are spaced apart from each other in parallel at an interval that corresponds to a height between an upper end of the refrigerant channel 122 and a lower end of the refrigerant channel 122. Combination of the first plate member 124 and the second plate member 127 may be performed at a position at which the refrigerant channel 122 is not interfered with the plate members.

As shown in FIG. 3, the first plate member 124 and the second plate member 127 may be disposed between the plurality of battery cells 112 and the coolant plate 130. The first plate member 124 may be arranged to enable heat exchange with the plurality of battery cells 112 due to contact therewith, and the second plate member 127 may be arranged to enable heat exchange with the coolant plate 130 due to contact therewith. Specifically, the first plate member 124 may be arranged to be in contact with (e.g., abut) the lower ends (e.g., surfaces facing the coolant plate) of the plurality of battery cells 112 arranged in a line, and the second plate member 127 may be arranged to be in contact with an upper end (e.g., a surface facing the plurality of battery cells) of the coolant plate 130.

A surface of the first plate member 124 in contact with the surfaces of the plurality of battery cells 112 may be configured as a surface (e.g., a flat surface) that corresponds to or marches the surfaces (exactly, surfaces of the cell covers holding the plurality of battery cells) of the plurality of battery cells 112, and a surface of the second plate member 127 in contact with a surface of the coolant plate 130 may be configured as a surface that corresponds to or marches the surface of the coolant plate 130. In other words, the first plate member 124 having surface in contact with the plurality of battery cells 112 may be formed as a flat surface and may be a flat plate, and the second plate member 127 with a surface in contact with the coolant plate 130 may be formed as a flat surface and may be a flat plate.

The refrigerant channel 122 may be configured to have the corrugated structure which allows the refrigerant to flow in the arranged directions of the battery cells 112. The first plate member 124 and the second plate member 127 may have a first corrugated part 125 and a second corrugated part 128 thereon respectively to include the refrigerant channel 122 having the corrugated structure. The first plate member 124 may include the first corrugated part 125 on a surface thereof (e.g., a surface facing the coolant plate) which is not in contact with the battery cells 112 (e.g., spaced apart from the cells), and the second plate member 127 may include the second corrugated part 128 on a surface thereof (e.g., a surface facing the battery cells) which is not in contact with the coolant plate 130 (e.g., spaced apart from the coolant plate).

Each of the first corrugated part 125 and the second corrugated part 128 may be formed to be a plate type having a cross-section of the corrugated structure, and may be joined and fixed by welding to the first plate member 124 and the second plate member 127 respectively. The first plate member 124 and the second plate member 127 may be combined with each other, with an interval between the first corrugated part 125 and the second corrugated part 128 maintained at a predetermined interval, and a space corresponding to the interval may be the refrigerant channel 122. The interval may be constantly maintained in an extending direction of the refrigerant channel 122.

Furthermore, the first corrugated part 125 may have an area 125a (hereinbelow, referred to as 'a first joined area') joined to the surface of the first plate member 124 while being in surface contact with the surface of the first plate member 124, and an area 125b (hereinbelow, referral to as 'a first disjoined area') not being joined to the surface of the first plate member 124 and the two areas may be arranged alternately. The second corrugated part 128 may have an area 128a (hereinbelow, referral to as 'a second joined area') joined to the surface of the second plate member 127 while being in surface contact with the surface of the second plate member 127, and an area 128b (hereinbelow, referral to as 'a second disjoined area') not being joined to the surface of the second plate member 127 and the two areas may be arranged alternately.

When the first plate member 124 and the second plate member 127 are combined with each other, the first corrugated part 125 and the second corrugated part 128 may be arranged such that the first joined area 125a faces the second disjoined area 128b, and the second joined area 128a faces the first disjoined area 125b. In particular, a space between the first joined area 125a and the second disjoined area may be the refrigerant heating channel 122a, a space between the second joined area 128a and the first disjoined area 125b may be the refrigerant cooling channel 122b, and a space between the first disjoined area 125b and the second disjoined area 128b may be the refrigerant transfer channel 122c. Empty spaces in which the refrigerant does not flow may be provided between the first disjoined area 125b and the first plate member 124, and between the second disjoined area 128b and the second plate member 127.

In addition, at least one first fin 126 may be disposed on a surface of the first corrugated part 125 corresponding to the first joined area 125a by protruding from the surface of the first corrugated part, and at least one second fin 129 may be disposed on a surface of the second corrugated part 128 corresponding to the second joined area 128a by protruding from the surface of the second corrugated part. The first fin 126 may be joined by welding to a surface of the first joined area 125a, and the first fin 126 may be joined by welding to a surface of the second joined area 128a. The first fin 126 may extend toward the refrigerant heating channel 122a, and the second fin 129 may extend toward the refrigerant cooling channel 122b. The first fin 126 and the second fin 129 may be fixed by furnace brazing, resistance welding, ultrasonic welding, and laser welding, etc. to the surfaces of the first corrugated part 125 and the second corrugated part 128 respectively. The first fin 126 and the second fin 129 increase contact surfaces between the refrigerant plate 120 and the refrigerant, thereby increasing a heat exchange amount of the refrigerant.

The refrigerant plate 120 may include the first corrugated part 125 and the second corrugated part 128 having the refrigerant channel 122 defined by surrounding the refrigerant channel 122 and the first corrugated part 125 and the second corrugated part 128 may be joined to and supported by the first plate member 124 and the second plate member 127 respectively, thereby increasing rigidity of the refrigerant plate 120 and the heat exchange efficiency of the refrigerant. When without using the first plate member 124 and the second plate member 127, only the first corrugated part 125 and the second corrugated part 128 are used to form the refrigerant plate, contact surfaces of the refrigerant plate with the battery cells 112 and the coolant plate 130 decrease, and thus a heat exchange efficiency achieved by the refrigerant plate being in contact therewith decreases.

In other words, when the first plate member 124 and the second plate member 127 are not used, the refrigerant plate is in contact with the battery cells 112 and the coolant plate 130 only on the first joined area 125a of the first corrugated part 125 and the second joined area 128a of the second corrugated part 128, and the refrigerant plate is not in contact with the battery cells 112 and the coolant plate 130 on the first disjoined area 125b of the first corrugated part 125 and the second disjoined area 128b of the second corrugated part 128, and thus the heat exchange efficiency achieved by the refrigerant plate being in contact therewith decreases. However, when the first plate member 124 and the second plate member 127 are provided to form the refrigerant plate 120, the first plate member 124 and the second plate member 127 are in contact with the battery cells 112 and the coolant plate 130 respectively without disjoined areas, and thus heat exchange efficiency achieved by the refrigerant plate 120 being in contact therewith increases.

In addition, the first corrugated part 125 and the second corrugated part 128 may be bent in structure. Accordingly, defining the refrigerant channel 122 between the first corrugated part 125 and the second corrugated part 128 by combining the first plate member 124 with the second plate member 127 in such a manner that the first corrugated part 125 and the second corrugated part 128 are joined to the first plate member 124 and the second plate member 127 respectively is easier in manufacturing process than defining the refrigerant channel 122 by combining the first corrugated part 125 with the second corrugated part 128 directly.

Meanwhile, the coolant plate 130 may be disposed at one side of the refrigerant plate 120 to enable heat exchange of the coolant plate with the refrigerant plate 120 due to contact therewith, and may be disposed at a side opposing the battery module 110, with the refrigerant plate 120 between the battery module and the coolant plate. The coolant plate 130 may include the coolant channel 132 in which the coolant flows, and the coolant may liquefy the refrigerant evaporated by heat produced in the battery cells 112. At least one coolant channel 132 may be provided in the coolant plate 130. When the coolant plate 130 includes a plurality of coolant channels, the plurality of coolant channels 132 may be disposed in directions orthogonal to the arranged directions of the battery cells 112. In particular, each of the plurality of coolant channels 132 may extend in the arranged directions of the battery cells 112, and the flow direction of the coolant flowing in the coolant channels 132 may be the same as the flow direction of the refrigerant flowing in the refrigerant channel 122.

Furthermore, as not shown in the accompanying drawings, the plurality of coolant channels 132 provided in the coolant plate 130 may be disposed in the same directions as the arranged directions of the battery cells 112. The coolant may turn a gas-phase refrigerant into a liquid-phase refrigerant to enable the continuous phase change of the refrigerant in the refrigerant channel 122, and the refrigerant may be selected and used in consideration of an operation temperature range of the battery cells 112.

In addition, the refrigerant plate 120 may include interface members 141, 142 disposed on opposite sides thereof to improve a heat exchange performance of the refrigerant. In other words, a first interface member 141 may be disposed between the refrigerant plate 120 and the battery cells 112, and a second interface member 142 may be disposed between the refrigerant plate 120 and the coolant plate 130. The first interface member 141 and the second interface member 142, which are made of a thermal interface material (TIM), may be configured as flat plates such that the first interface member is in close contact with the cell covers 114 and the refrigerant plate 120 therebetween, and the second interface member is in close contact with the refrigerant plate 120 and the coolant plate 130 therebetween. The TIM is a material which fills the gap or air-filled pore space between the cell covers 114 and the refrigerant plate 120 and between the refrigerant plate 120 and the coolant plate 130. In other words, the TIM is a material capable of improving heat exchange performance of the refrigerant when the first interface member 141 and the second interface member 142 are used, compared to when the first interface member 141 and the second interface member 142 are not used.

Figure 5:
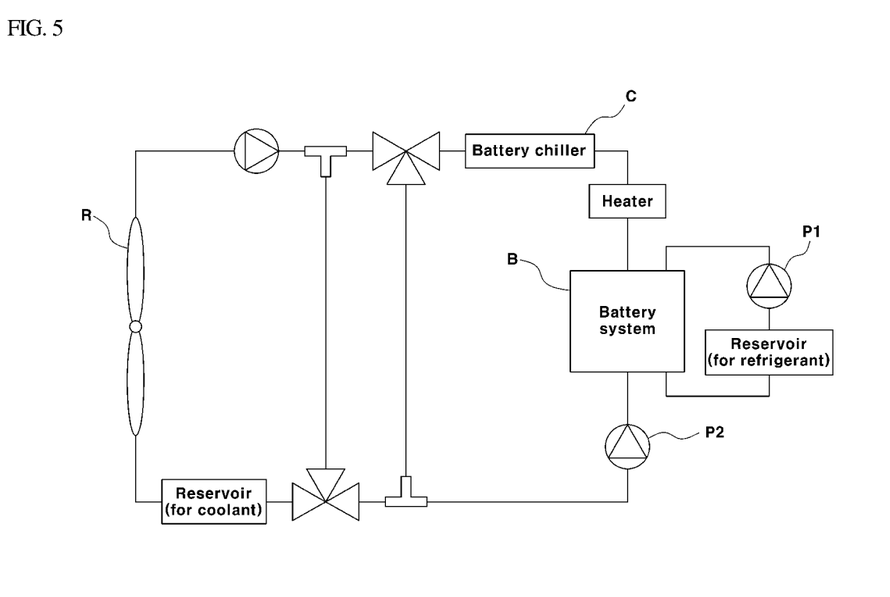
FIG. 5 is a block diagram showing a circulation method of the refrigerant and a coolant provided into a battery system according to an exemplary embodiment of the present invention.

FIG. 5 is a block diagram showing a circulation method of the refrigerant and the coolant provided into a battery system. As shown in FIG. 5, the battery system B, in which the refrigerant plate and the coolant plate are provided for cooling the battery module, may include a refrigerant pump P1 for circulating the refrigerant, and a coolant pump P2 for circulating the coolant to maintain temperature of the coolant at a predetermined range (e.g., a temperature range capable of restoring the evaporated refrigerant to the liquid refrigerant) for cooling the refrigerant, whereby the coolant discharged from the coolant plate may be cooled by a battery chiller C and/or a radiator R.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery cooling device for a vehicle for cooling a battery module composed of a plurality of battery cells, comprising:
    a refrigerant plate that extends in arranged directions of the plurality of battery cells and includes a refrigerant flowing for cooling the plurality of battery cells; and
    a coolant plate disposed to enable heat exchange with the refrigerant plate, and having a coolant flowing for liquefying a refrigerant evaporated by heat produced in the battery cells, wherein the refrigerant plate includes:
        a first plate member disposed to enable heat exchange with the plurality of battery cells;
        a second plate member disposed to enable heat exchange with the coolant plate; and
        a refrigerant channel disposed between the first plate member and the second plate member, and having the refrigerant flowing in the refrigerant channel,
    wherein the first plate member is disposed to be in contact with the plurality of battery cells, and the second plate member is disposed to be in contact with the coolant plate, and
    wherein the first plate member includes a first corrugated part having ridges and grooves on a surface of the first plate member which is not in contact with the plurality of battery cells, and the second plate member includes a second corrugated part having ridges and grooves on a surface of the second plate member which is not in contact with the coolant plate, and the first corrugated part and the second corrugated part are spaced apart from each other at an interval corresponding to a width of the refrigerant channel.

2. The battery cooling device of claim 1, wherein the first plate member and the second plate member are flat plates.

3. The battery cooling device of claim 1, wherein the refrigerant channel includes a plurality of refrigerant heating channels in which the refrigerant is heated by heat exchange with the battery cells, and a plurality of refrigerant cooling channels in which the refrigerant is cooled by heat exchange with the coolant plate, each of the refrigerant heating channels and each of the refrigerant cooling channels being alternately disposed in the arranged directions of the battery cells.

4. The battery cooling device of claim 3, wherein the refrigerant heating channel is disposed between the battery cells and the coolant plate to neighbor the battery cells, and the refrigerant cooling channel is disposed between the battery cells and the coolant plate to neighbor the coolant plate.

5. The battery cooling device of claim 1, wherein cell covers supporting the plurality of battery cells and the refrigerant plate are in contact with each other via a first interface member made of a thermal interface material for filling a gap or a pore space between the cell covers and the refrigerant plate.

6. The battery cooling device of claim 1, wherein the coolant plate and the refrigerant plate are in contact with each other via a second interface member made of a thermal interface material for filling a gap or a pore space between the coolant plate and the refrigerant plate.

7. The battery cooling device of claim 3, wherein the refrigerant channel includes a plurality of refrigerant transfer channels, each of the plurality of refrigerant transfer channels being disposed between each of the plurality of refrigerant heating channels and each of the plurality of refrigerant cooling channels.

8. The battery cooling device of claim 3, wherein the first corrugated part includes at least one fin that extends therefrom toward the refrigerant heating channel, and the second corrugated part includes at least one fin that extends therefrom toward the refrigerant cooling channel.

9. The battery cooling device of claim 8, wherein the fin disposed on the first corrugated part and the fin disposed on the second corrugated part are joined on surfaces of the first corrugated part and the second corrugated part respectively by any one joining method selected among furnace brazing, resistance welding, ultrasonic welding, and laser welding.

* * * * *